Dec. 14, 1954   F. C. I. MARCHANT ET AL   2,696,711
GAS TURBINE ENGINE AND THE STARTING THEREOF
Filed Aug. 13, 1948   4 Sheets-Sheet 1

INVENTORS
F.C.I. MARCHANT &
G. M. LEWIS

Dec. 14, 1954   F. C. I. MARCHANT ET AL   2,696,711
GAS TURBINE ENGINE AND THE STARTING THEREOF
Filed Aug. 13, 1948   4 Sheets-Sheet 2

INVENTORS
F. C. I. MARCHANT &
G. M. LEWIS
by Wilkinson Mawhinney
Attorneys

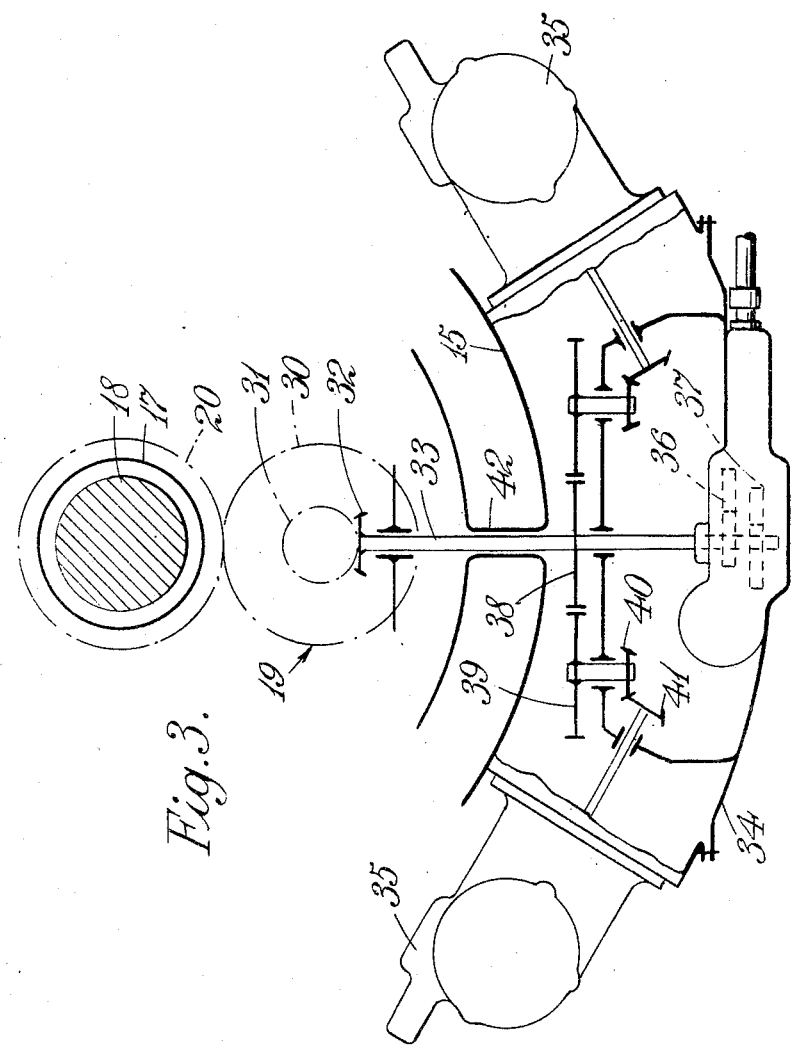

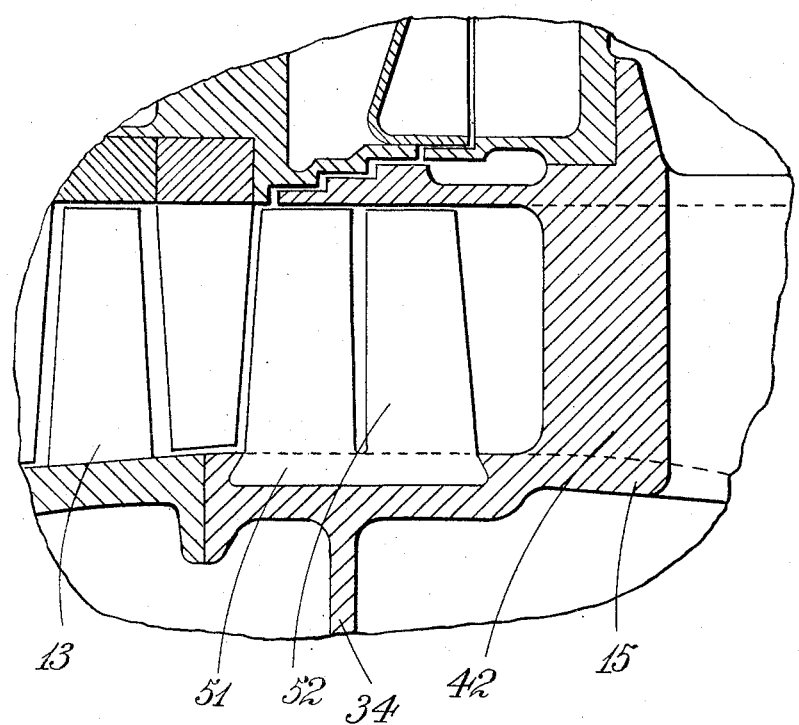

United States Patent Office 2,696,711
Patented Dec. 14, 1954

2,696,711

GAS TURBINE ENGINE AND THE STARTING THEREOF

Francis Charles Ivor Marchant and Gordon Manns Lewis, Bristol, England, assignors to The Bristol Aeroplane Company Limited, Bristol, England, a British company Application August 13, 1948, Serial No. 44,014

2 Claims. (Cl. 60—39.14)

This invention concerns gas-turbine engines and has for its object to improve the starting and operating qualities of the engine.

According to this invention a gas-turbine engine having a pair of turbines through which the working medium passes in succession and a compounded compressor assembly, one unit of which is independently driven by a turbine, is characterised in that an engine starter is provided to drive said unit only of the compressor and all or certain of the engine accessories.

The present invention finds particular application to gas-turbine engines for driving aeroplanes and according to another feature of the invention such an engine having a low and high-pressure compressor each of which is independently driven by a turbine through which the working medium passes in succession is characterised in that an engine starter is provided to drive only the high-pressure compressor and its turbine and in that the engine accessories are driven with the high-pressure compressor and the aeroplane accessories are driven with the low-pressure compressor.

Figure 1:
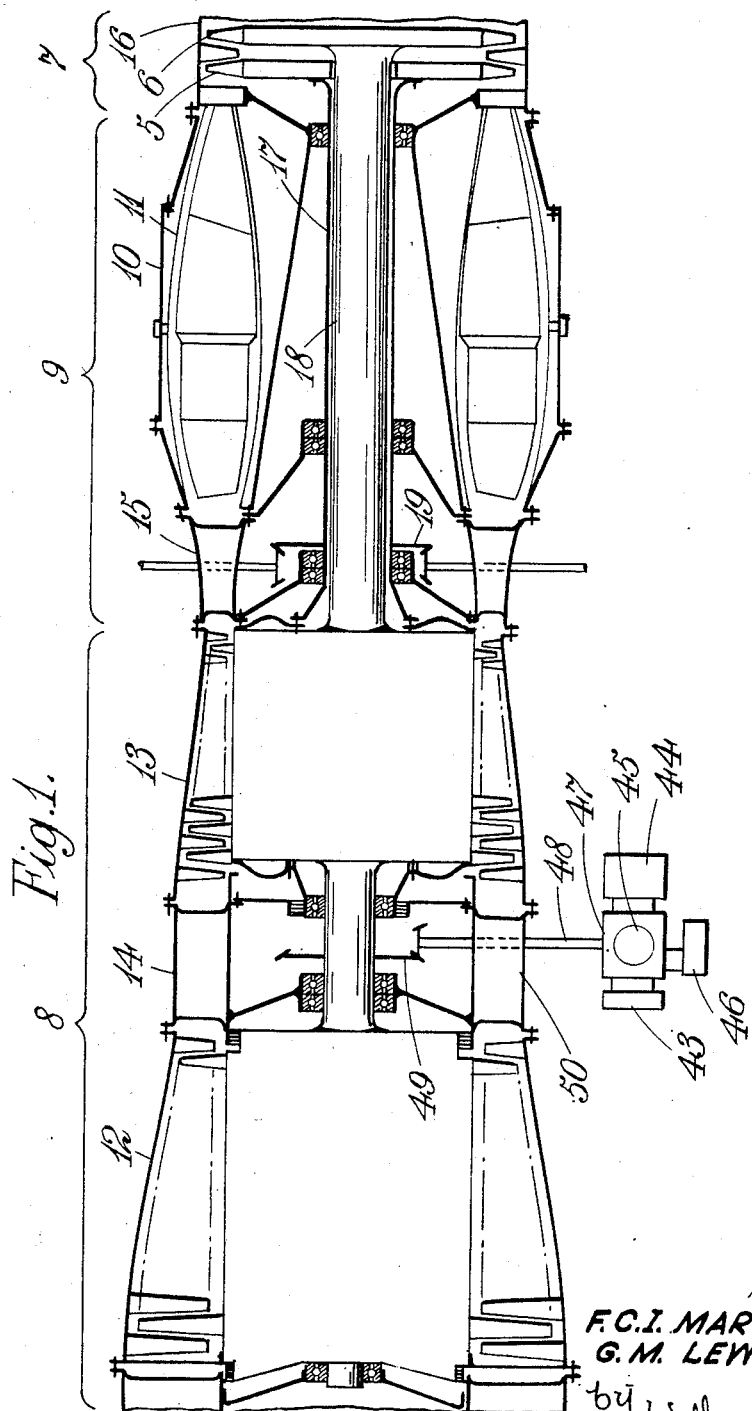
Figure 2:
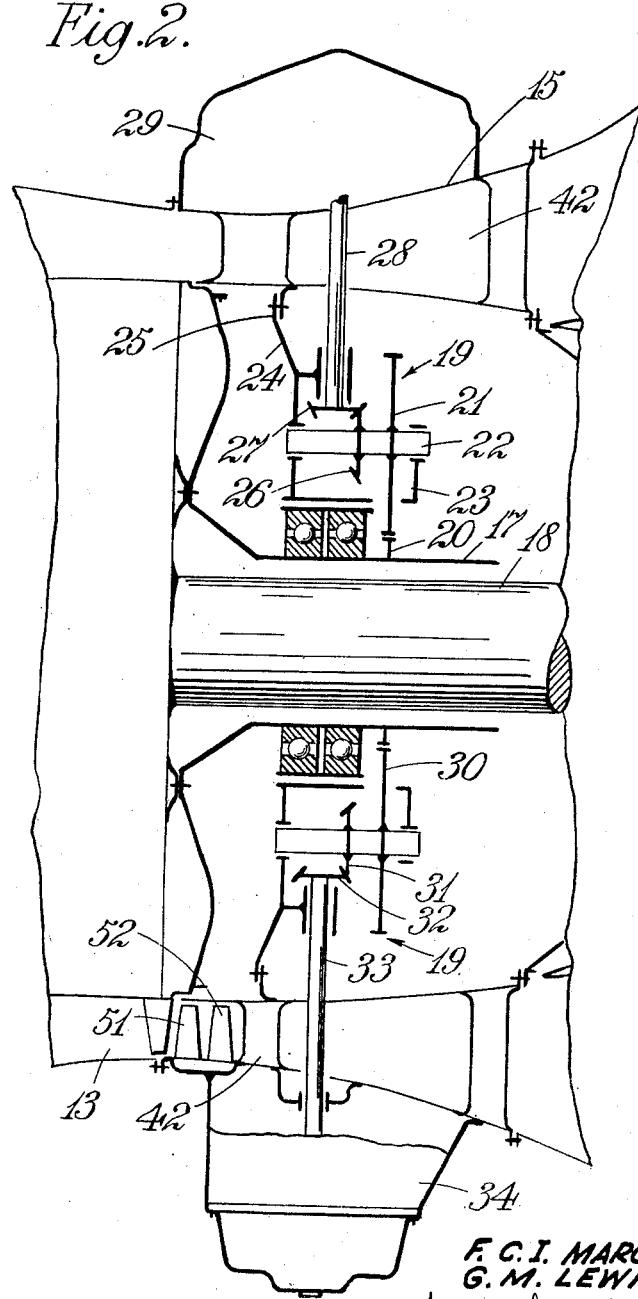

A practical application of the present invention will now be described, by way of example only, with reference to the accompanying drawings whereof:

Figure 1 is a diagrammatic sectional elevation of a gas-turbine engine in accordance with the present invention, Figure 2 is a view to an enlarged scale of a part of the engine of Figure 1, Figure 3 is a transverse cross-section showing a part of the engine of Figure 1 and to an enlarged scale, and Figure 4 is a sectional elevation showing a detail of construction of the outlet from the compressor assembly.

Referring to Figure 1:

The engine comprises a pair of turbines 5 and 6 which form part of the turbine assembly generally indicated at 7. The engine also comprises a compressor assembly, generally indicated at 8, and combustion, apparatus, generally indicated at 9, which connects the compressor assembly 8 with the turbine assembly 7.

The combustion apparatus comprises an annular combustion chamber 10 which contains a plurality of flame tubes 11, fuel being individually supplied to each flame tube in known manner, the fuel being burnt in the flame tube and the products of combustion passing along the annular combustion chamber 10 to the turbine assembly 7. The air for combustion is obtained from the compressor assembly 8. The products of combustion pass in succession through the turbines 5 and 6 respectively.

The compressor assembly 8 comprises a low-pressure axial-flow compressor 12 and a high-pressure axial-flow compressor 13. The compressor 12 delivers to compressor 13 which in turn delivers to the combustion apparatus 9.

Air from the compressor 12 is conveyed to the compressor 13 through an annular conduit 14 which lies between the compressors. The stator casings of the compressors 12 and 13 are bolted to the conduit 14. The compressor 13 is connected to the combustion apparatus 9 by an annular air-duct casing 15.

It will be noted in Figure 1 that the casing 15 is bolted to the stator casing of compressor 13 and to the outer wall of the annular combustion chamber 10. The arrangement described therefore provides a continuous outer shell which envelopes the engine from the compressor intake to the outlet end of the turbine—the shroud ring 16 of the turbine forming a part of the shell.

The diameter of this shell decreases from the compressor inlet to the annular combustion chamber and then increases so that the engine shell has a waist portion constituted by the air-duct casing 15.

The high-pressure compressor 13 is coupled to the high-pressure turbine 5 by a driving shaft 17 and, similarly, the low-pressure compressor 12 is connected with the low-pressure turbine 6 by a driving shaft 18, the latter being nested within hollow shaft 17.

The engine which is being described is particularly adapted for use in an aeroplane and, as is well known, the engine and the aeroplane each requires for its operation certain accessories. For instance, the engine requires a starter, lubricating pumps, fuel pumps and so on whilst the aeroplane requires vacuum pumps, generators, pressure pumps and so on.

In an engine constructed in accordance with this invention the engine starter and certain other engine accessories are carried by the casing 15 and these are coupled through suitable gearing with the shaft 17. This gearing is diagrammatically indicated in Figure 1 at 19.

The detailed construction of the gearing 19 of Figure 1 is shown in Figures 2 and 3 to which reference will now be had.

The shaft 17 carries a pinion 20 which meshes with a gearing wheel 21 mounted on a layshaft 22. The latter is supported by bearings in a frame 23 which is integrally formed with a diaphragm 24 that is bolted, at 25, to the inner wall of the casing 15. The layshaft 22 carries a bevel gear 26 which meshes with a bevel pinion 27 carried by a shaft 28. The latter is the driving shaft of the starter 29 which is bolted to the upper part of casing 15. In this way the starter is connected to the shaft 17.

A similar gear train 20, 30, 31, 32 is provided to connect the shaft 17 with a driving shaft 33 which extends downwardly to the lower part of the casing 15.

Bolted to the under part of the casing 15 is a gear-box 34 which carries a pair of fuel pumps 35, the pressure pump 36 and a scavenge pump 37. The scavenge and pressure pumps 36, 37 are driven directly by the shaft 33. The fuel pumps 35 are driven through a gear train 38, 39, 40, 41 carried within the gear-box 34.

It will thus be seen that the starter 29 and certain of the engine accessories 35, 36 and 37 are coupled to the shaft 17 by a gear train (which lies within the inner wall of the casing 15) and by the radially disposed shafts 28, 33. The inner and outer walls of the casing 15 are connected together by a number of radial hollow arms 42 and each of shafts 28, 33 passes through one of said arms. The arms 42 are streamlined in the direction of the passage of air from the compressor to the combustion chamber.

With the arrangement described, when it is desired to start the engine the starter 29 is brought into operation to drive the shaft 17. As a consequence the high-pressure compressor 13 and its turbine 5 only are rotated and at the same time the engine accessories 35, 36 and 37 are driven. These accessories include those essential for the starting and running of the engine. When combustion is started the high-pressure turbine 5 commences to drive the compressor 13 and the engine accessories. In this way the starting operation is smoothly taken over by the turbine 5: at the same time the turbine 6 commences to drive the low-pressure compressor 12.

Incorporated in the coupling between the starter 29 and the shaft 17 is a known construction of free wheel device to ensure that when the turbine 5 starts up the shaft 17 is free to over-run the starter 29.

It is preferred that the aircraft accessories be not driven when starting up the engine since this requires a starter of greater horse-power.

Accordingly the aircraft accessories are mounted on a gear-box supported from a convenient part of the aircraft and driven by a radial shaft connected with the low-pressure shaft 18. Such an arrangement is diagrammatically shown in Figure 1 in which the aircraft accessories 43, 44, 45 and 46 are carried by a gear-box 47 which is driven by a shaft 48. The latter is coupled to the shaft 18 by a gear train generally indicated at 49, the shaft 48 passing through a hollow radial arm 50 which connects the inner and outer walls of the conduit 14.

When the turbine 5 commences to operate under its own power the low-pressure turbine will be brought into operation to drive the compressor 12 as indicated above. When this occurs the engine as a whole is delivering power so that ample is then available to drive the aircraft accessories 43—47.

The arms 42, 50 which extend across the walls of the casing 15 and conduit 14 respectively direct the air axially through the engine. It is necessary that the circumferential component of movement of the air leaving the compressor 13 be reduced or eliminated and for this reason the outlet from the compressor 13 is provided with two rows of stator vanes 51, 52 (see Figure 4) lying one immediately behind the other. The stator vanes 51 reduce the circumferential component and direct air more truly along an axial path into row 52 where the procedure is repeated. The air leaving the compressor assembly 8 flows substantially lengthwise of the engine.

Two rows of stator vanes 51, 52 are provided for straightening the air flow since the circumferential component to be eliminated is large. The provision of two rows of vanes under such a condition does not so adversely affect the compressor efficiency as when a single row of straightening vanes is provided.

The provision of two rows of stator vanes has the advantage that the two rows of vanes may be relatively set so as to insure the most efficient flow of air through the vanes. For instance it may be more advantageous to space the downstream row of vanes circumferentially of the upstream row of vanes so that vanes 52 lie between vanes 51 either centrally or otherwise. With this arrangement also greater spacing of the vanes may be allowed for and the combined effect is that the stream of air is turned in the axial direction with smaller loss than if a single row of vanes were provided.

It is to be understood that the invention is not restricted to a gas-turbine engine having low and high-pressure axial-flow compressors. The assembly 8 may consist of a low-pressure axial-flow compressor delivering to a high-pressure centrifugal compressor or alternatively it may consist of a low-pressure axial-flow compressor which delivers to a combined axial and centrifugal compressor.

We claim:

1. A gas turbine engine for propelling an aeroplane comprising a multi-stage turbine, a multi-stage compressor each stage of which is independently driven by a rotor of the turbine, the compressor and turbine having a common axis of rotation and being spaced apart lengthwise thereof, combustion equipment in the space between the compressor and turbine to receive air from the compressor and to deliver the products of combustion to the turbine, accessories necessary for the operation of the engine, said accessories being driven with the high-pressure compressor, accessories necessary for the operation of the aeroplane, said accessories being driven by the turbine rotor for a low-pressure compressor, an engine starter to drive only said high-pressure compressor and the engine accessories, and a shell enveloping the engine provided with a waist portion having an outside diameter less than the over-all outside diameter of said shell, said engine starter and said engine accessories being disposed around said waist portion of the shell so as to lie substantially within the over-all outside diameter of the shell.

2. A gas turbine engine as claimed in claim 1 characterized by the fact that said waist portion comprises an air-duct casing connecting the high-pressure compressor to said combustion equipment, that said casing has concentric inner and outer walls and radial arms extending across the walls, at least two of said arms being hollow each to receive a shaft connecting said starter and said engine accessories to the driving shaft between the high-pressure-turbine and its compressor.

References Cited in the file of this patent

UNITED STATES PATENTS

| Number | Name | Date |
| --- | --- | --- |
| 2,238,905 | Lysholm | Apr. 22, 1941 |
| 2,396,911 | Anxionnaz | Mar. 19, 1946 |
| 2,445,114 | Halford | July 13, 1948 |
| 2,514,513 | Price | July 11, 1950 |
| 2,529,973 | Sédille et al. | Nov. 14, 1950 |